United States Patent [19]
Oertley

[11] Patent Number: 5,393,134
[45] Date of Patent: Feb. 28, 1995

[54] FASTENING PLATE FOR SPROCKET SEGMENTS

[75] Inventor: Thomas E. Oertley, Dunlap, Ill.
[73] Assignee: Caterpillar Inc., Peoria, Ill.
[21] Appl. No.: 112,030
[22] Filed: Aug. 26, 1993
[51] Int. Cl.⁶ ............................................. B62D 55/12
[52] U.S. Cl. .................................... 305/57; 305/56; 301/31
[58] Field of Search ............... 305/29, 56, 57; 474/95, 474/96, 152, 165, 901, 902; 301/23, 30, 31

[56] References Cited

U.S. PATENT DOCUMENTS

| | | | |
|---|---|---|---|
| 1,354,468 | 10/1920 | Copithorn | 301/31 |
| 1,381,565 | 6/1921 | Klineline | 301/31 |
| 2,193,131 | 3/1940 | Hansen | 301/31 |
| 2,365,544 | 12/1944 | Geyer et al. | 74/243 |
| 3,960,412 | 6/1976 | Shuler | 305/57 |
| 3,972,106 | 8/1976 | Orr | 29/401 R |
| 3,996,814 | 12/1976 | Westlake | 74/243 DR |
| 4,069,856 | 1/1978 | Sogge | 305/57 X |
| 4,150,857 | 4/1979 | Dester et al. | 305/57 X |
| 4,332,573 | 6/1982 | Uchida et al. | 474/94 |
| 4,511,186 | 4/1985 | Sasamoto | 305/57 |

FOREIGN PATENT DOCUMENTS 11505583  6/1963  Germany .................... 305/56

Primary Examiner—Russell D. Stormer
Attorney, Agent, or Firm—Claude F. White

[57] ABSTRACT

A plurality of fastening plates are used to securely connect a plurality of teeth segments to a support member to form a sprocket wheel. Each of the fastening plates has a plurality of threaded through holes and a plurality of threaded fasteners engage the threaded holes to secure the teeth segments to the support member. Each of the fastening plates also has a flat planar surface which contacts the teeth segments and provides a large area of clamping surface contact. Each fastening plate spans a joint between adjacent teeth segments and contacts a portion of at least two adjacent segments. Because of the large clamping surface area provided by the flat planar surfaces of the fastening plates, potential for tangential slippage of the teeth segments under load is greatly reduced.

11 Claims, 2 Drawing Sheets

FASTENING PLATE FOR SPROCKET SEGMENTS

TECHNICAL FIELD

This invention relates generally to sprocket teeth segments for track-type machines and more particularly to a fastening plate for securing the sprocket teeth segments to the machine.

BACKGROUND ART

Earthmoving and construction type machines, which have endless self-laying track chain assemblies for support and propulsion, generally utilize a sprocket wheel to engage and drive the track chain. Several different types of sprocket wheels have been used in the past. These include a single wheel member having a plurality of integral teeth, hub members which accommodate a plurality of separate individual teeth, and a circular support member for supporting multiple segments, with each segment having several teeth. Each segment is generally connected to the circular support member by a plurality of threaded fasteners and cooperating threaded nuts.

One type of drive sprocket having a plurality of separate individual teeth connected to a hub portion is disclosed in U.S. Pat. No. 2,365,544, issued to H. D. Geyer et al. on Dec. 19, 1944. In this patent, the teeth are fulcrumed to the hub portion somewhere near the middle of the teeth so the teeth can rotate in either direction about the fulcrum. Resilient means are provided to return the teeth to their original no load position. This arrangement is intended to make the teeth self-adjusting to accommodate variations in the track chain.

Another type of sprocket wheel, having a plurality of segments with several teeth on each segment, is shown in U.S. Pat. No. 4,511,186, issued to T. Sasamoto on Apr. 16, 1985. In this patent, the teeth segments are connected to an outer tube by a plurality of threaded bolts and nuts.

Each of the above-noted sprocket assemblies provides replaceable drive teeth, either individually or in segments. However, the teeth are secured to a support member so that they are intended to deflect, or by bolts and nuts which may allow deflection of the segments under heavy loads.

The present invention is directed to overcoming one or more of the problems, as set forth above.

DISCLOSURE OF THE INVENTION

In one aspect of the present invention, a fastening plate for connecting a multi-toothed sprocket segment to a support member includes an arcuate shaped metal bar having a substantially flat planar surface. The planar surface is adapted to contact the sprocket segments when the segments are installed on the support member. The metal bar has a plurality of threaded or non-threaded through holes which are used in conjunction with threaded fasteners to connect the sprocket segments to the support member.

In self-laying track-type machines utilizing endless track assemblies, the driving power from the machine is transferred to the endless track assemblies by multiple toothed sprocket wheels. In large size machines the torque applied to the sprocket teeth can be of large magnitude. It is advantageous to make the sprocket wheels from a plurality of individual segments, with each segment having a plurality of teeth and being bolted to a support member. Ideally, each segment would have as few teeth as possible, such as four or five teeth. However, to prevent the segments from slipping under high forces, some segments require as many as nine teeth and nine bolt and nut assemblies.

The subject invention utilizes threaded or non-threaded fastening plates to secure the sprocket segments to the support member. The fastening plates provide increased clamping surface area to resist torque forces and reduce tangential slippage of the individual sprocket segments. If non-threaded fastening plates are used, conventional threaded fasteners and nuts are used to secure the fastening plates and sprocket segments together.

BEST MODE FOR CARRYING OUT THE INVENTION

Figure 1:
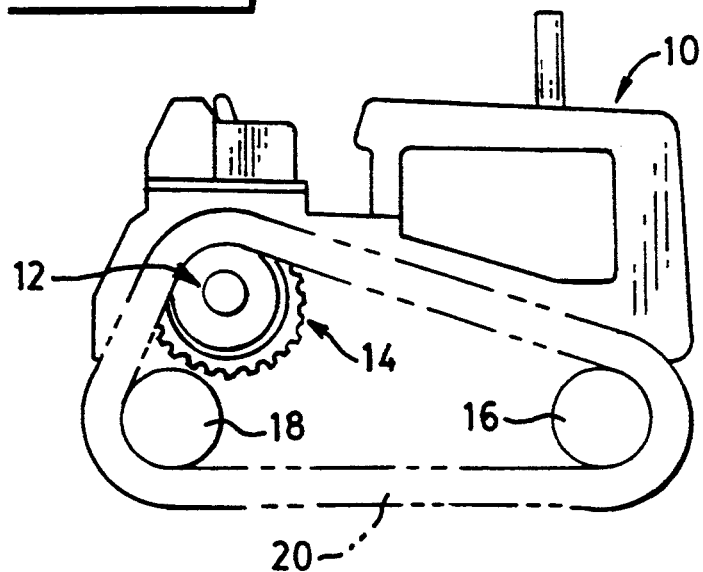
FIG. 1 is a diagrammatic side elevational view of a work machine incorporating the subject invention.
Figure 3:
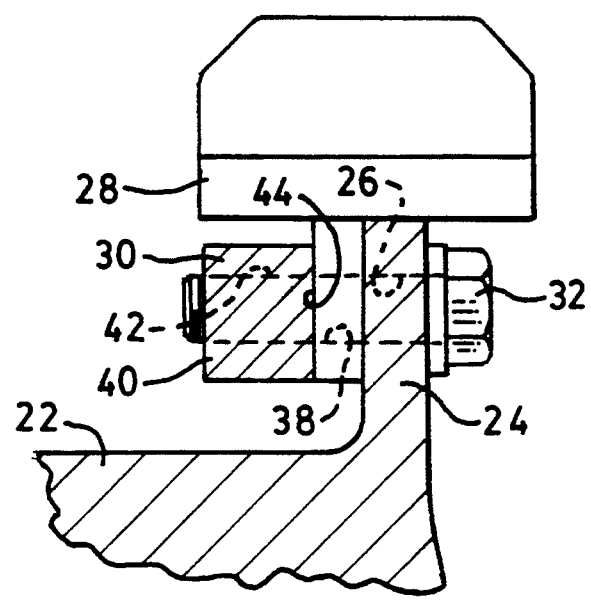
FIG. 3 is an enlarged diagrammatic sectional view, taken generally along lines 3—3 of FIG. 2.
Figure 2:
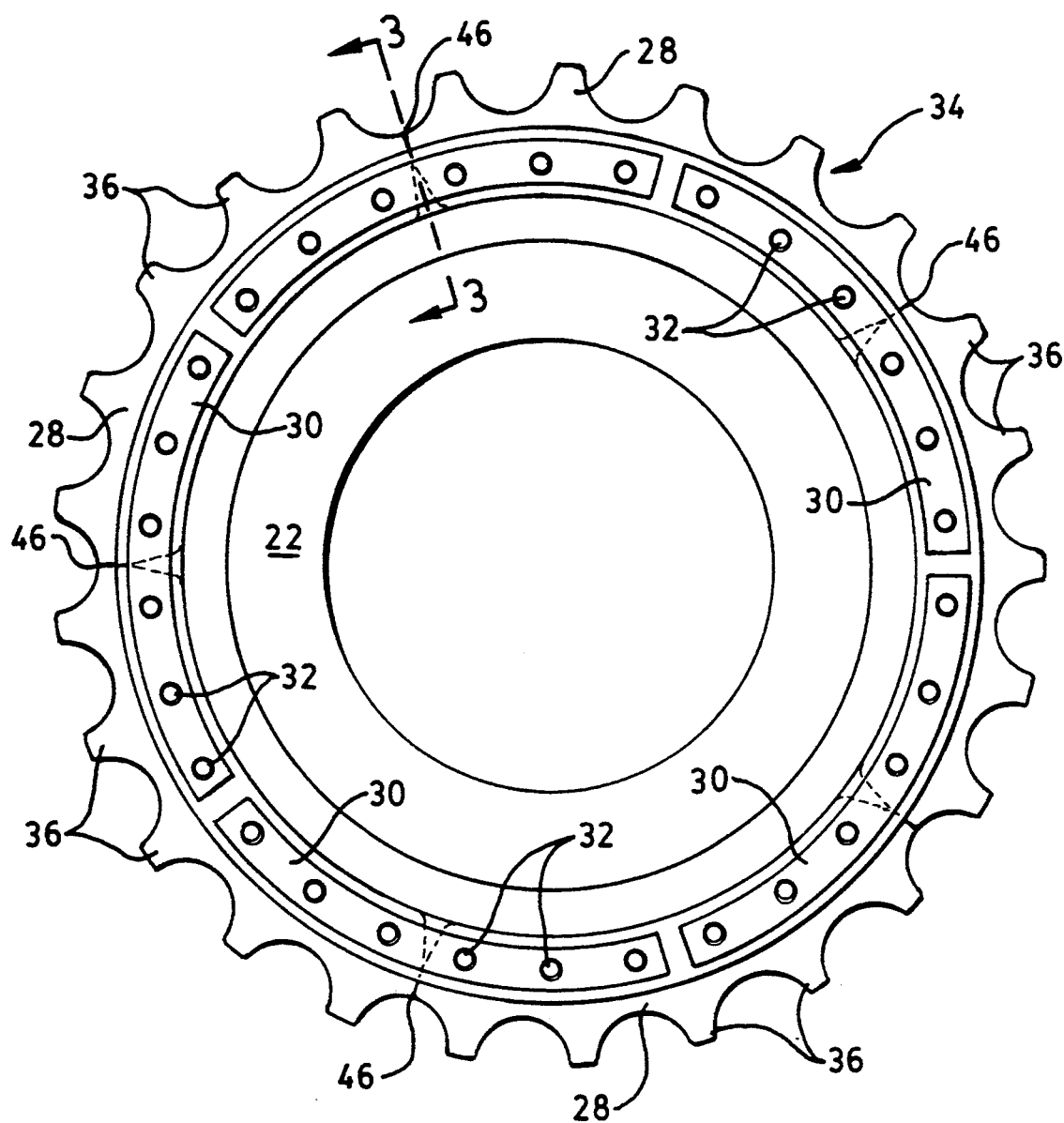
FIG. 2 is an enlarged diagrammatic side elevational view of a sprocket assembly incorporating the subject invention.

Referring to the drawings, a work machine 10, such as a self-laying track-type machine 10, has a power drive system 12, a drive sprocket assembly 14, first and second idler wheels 16,18, and an endless track chain assembly 20 which encircles the sprocket assembly 14 and the idler wheels 16,18. The sprocket assembly 14 is adapted to transfer power from the machine 10 to the track assembly 20.

The sprocket assembly 14 includes a circular support hub 22 which has a flange portion 24. The flange portion 24 defines a plurality of first apertures 26. The sprocket assembly 14 further includes a plurality of arcuate shaped teeth segments 28, a plurality of fastening plates 30, and a plurality of threaded fasteners 32. The teeth segments 28 are adapted to engage and encircle the flange portion 24 and form a sprocket wheel 34. Each teeth segment 28 has a plurality of teeth 36 and defines a plurality of second apertures 38. Although each segment 28 is illustrated with five teeth, the number of teeth 36 on each segment 28 can vary between two and up to one-half the number of teeth on the sprocket wheel 34. Adjacent segments 38 may also have a different number of teeth 36, such as four teeth 36 on one or more segments 38 and five teeth 36 on one or more other segments 38.

The fastening plates 30 and the threaded fasteners 32 are adapted to connect the multi-toothed sprocket segments 28 to the flange portion 24 of the support hub 22. Each fastening plate 30 includes an elongated arcuate shaped metal bar 40 which has a plurality of threaded through holes 42 and a substantially flat planar surface 44. In the installed condition of the segments 28 and the fastening plates 30 on the support hub 22, the planar surface 44 of each metal bar 40 is adapted to contact the segments 28.

The teeth segments 28 are arranged in a circular pattern around the support hub 22 and a joint 46 is formed at the juncture between adjacent segments 28. Preferably, each of the fastening plates 30 spans one of the joints 46 and is therefore in contact with a portion of two adjacent segments 28. In the installed condition, each of the threaded through holes 42 aligns with one of the first apertures 26 in the support member 22 and with one of the second apertures 38 in the segments 28. A threaded fastener 32 then penetrates the first and second apertures 26,38 and engages the threaded holes 42 to securely connect the segments 28 to the support member 22. Because of the additional surface contact provided by the fastening plates 30, the potential for tangential slippage of the teeth segments 28 under load is greatly reduced.

INDUSTRIAL APPLICABILITY

The subject fastening plates 30 are particularly useful for securely connecting a plurality of teeth segments 28 to a support member 22 for forming a sprocket wheel 34. The segments 28 are connected to the support member 22 by a plurality of threaded fasteners 32 which engage threaded holes 42 in the fastener plates 30 to clamp the segments 28 between the flange portion 24 and the fastening plates 30. In some applications, the holes 42 will not be threaded and threaded fasteners 32 and conventional nuts will connect the segments 28 and the fastening plates 30 to the support member 22. The flat planar surfaces 44 of the fastening plates 30 provide additional surface area to reduce the potential for tangential slippage of the segment 28 under load. The potential for slippage is also reduced because each of the fastening plates 30 spans a joint 46 between adjacent teeth segments 28, and is therefore in contact with a portion of at least two adjacent segments 28.

Other aspects, objects and advantages of this invention can be obtained from a study of the drawings, the disclosure, and the appended claims.

I claim:

1. A fastening plate for connecting multi-toothed sprocket segments to a support member, comprising:
    an elongated arcuate shaped metal bar having a plurality of through holes and a substantially flat planar surface, said planar surface being adapted to contact said sprocket segments in the installed condition of said sprocket segments to said support member, and each of said through holes being threaded and aligned with a first aperture defined by said support member and a second aperture defined by said segments.

2. A fastening plate, as set forth in claim 1, wherein each plate is in contact with a portion of at least two segments in the installed condition.

3. A fastening plate, as set forth in claim 1, wherein each threaded through hole and respective aligned first and second apertures is adapted to receive a threaded fastener.

4. A sprocket assembly for a self-laying track-type machine, comprising:
    a circular support member having a flange portion, said flange portion defining a plurality of first apertures;
    a plurality of teeth segments adapted to engage and encircle said flange portion, each segment having a plurality of teeth and defining a plurality of second apertures;
    a plurality of fastening plates, each plate having a plurality of through holes and a substantially flat planar surface, said planar surface of each fastening plate being adapted to contact at least one of said teeth segments, and each of said through holes being adapted to align with a respective first and second aperture; and
    a plurality of threaded fasteners, one adapted to penetrate each aligned first and second apertures and each aligned through hole in said fastening plates.

5. A sprocket assembly, as set forth in claim 4, wherein each fastening plate is in contact with a portion of at least two adjacent segments.

6. A sprocket assembly, as set forth in claim 4, wherein teeth segments and said fastening plates are arcuate shaped.

7. A sprocket assembly, as set forth in claim 4, wherein at least one of said segments has three teeth.

8. A sprocket assembly, as set forth in claim 4, wherein at least one of said sprocket segments has four teeth.

9. A sprocket assembly, as set forth in claim 4, wherein at least one of said sprocket segments has five teeth.

10. A sprocket assembly, as set forth in claim 4, wherein at least one of said sprocket segments has fourth teeth and at least one of said sprocket segments has five teeth.

11. A sprocket assembly, as set forth in claim 4, wherein each of said through holes in each fastening plate is threaded, and one of said threaded fasteners is adapted to engage each threaded through hole.

* * * * *